United States Patent
Adams et al.

(10) Patent No.: US 9,212,758 B2
(45) Date of Patent: Dec. 15, 2015

(54) QUICK CONNECT VALVE ACTUATOR

(71) Applicant: GE Oil & Gas Pressure Control LP, Houston, TX (US)

(72) Inventors: Keith M. Adams, Katy, TX (US); Lloyd R. Cheatham, Lake Jackson, TX (US)

(73) Assignee: GE Oil & Gas Pressure Control LP, Houston, TX (US)

( * ) Notice: Subject to any disclaimer, the term of this patent is extended or adjusted under 35 U.S.C. 154(b) by 278 days.

(21) Appl. No.: 13/832,884

(22) Filed: Mar. 15, 2013

(65) Prior Publication Data

US 2014/0183385 A1 Jul. 3, 2014

Related U.S. Application Data

(60) Provisional application No. 61/747,479, filed on Dec. 31, 2012.

(51) Int. Cl.
| | | |
|---|---|---|
| *F16K 31/00* | (2006.01) | |
| *F15B 15/14* | (2006.01) | |
| *F16K 31/122* | (2006.01) | |
| *F16K 31/126* | (2006.01) | |

(52) U.S. Cl.
CPC .............. *F16K 31/00* (2013.01); *F15B 15/1433* (2013.01); *F15B 15/1438* (2013.01); *F16K 31/1221* (2013.01); *F16K 31/1262* (2013.01); *Y10T 137/6065* (2015.04)

(58) Field of Classification Search
CPC ............... F15B 15/1438; F16K 37/008; F16K 37/0016; F16K 31/1221; F16K 31/1262; Y10T 137/8158; Y10T 137/8225; Y10T 137/6065

USPC ................................................... 137/551, 553
See application file for complete search history.

(56) References Cited

U.S. PATENT DOCUMENTS

| | | | |
|---|---|---|---|
| 2,610,820 A | 9/1952 | Markel | |
| 3,082,792 A | 3/1963 | Jenkins | |
| 3,139,898 A | 7/1964 | Wiltgen | |
| 3,792,717 A | 2/1974 | Tibbals | |
| 3,881,400 A * | 5/1975 | Lewis, Sr. .......................... 92/52 |

(Continued)

FOREIGN PATENT DOCUMENTS

| | | |
|---|---|---|
| DE | 102011015646 A1 | 10/2012 |
| GB | 2168787 A | 6/1986 |
| JP | 2010048271 A | 3/2010 |

OTHER PUBLICATIONS

PCT Search Report and Written Opinion dated Mar. 7, 2014 from corresponding Application No. PCT/US2013/077412.

*Primary Examiner* — Matthew W Jellett
(74) *Attorney, Agent, or Firm* — Bracewell & Giuliani LLP

(57) ABSTRACT

An actuator for operating a linear valve, such as a gate valve, includes a quick connect coupling between the housing and at least one of a bonnet and a power head assembly. In embodiments, the quick connect coupling includes a plurality of lugs spaced apart around an annular actuator housing surface, and a plurality of lugs spaced apart around an annular surface of another member such as a bonnet or power head, each of the lugs defining a plurality of slots therebetween. The lugs pass through corresponding slots, and then the housing is rotated relative to the other member until at least a portion of the lugs of each component are axially aligned in a locked position. The rotation is less than one full revolution of the rotated component. A latch prevents the component from rotating out of the locked position.

19 Claims, 6 Drawing Sheets

(56) References Cited

U.S. PATENT DOCUMENTS

| | | |
|---|---|---|
| 3,958,592 A | 5/1976 | Wells |
| 4,135,546 A | 1/1979 | Morrison |
| 4,135,547 A | 1/1979 | Akkerman |
| 4,491,060 A | 1/1985 | Boski |
| 4,529,330 A | 7/1985 | Boski |
| 4,633,898 A | 1/1987 | Denk |
| 4,721,284 A * | 1/1988 | Bankard .................. 251/86 |
| 4,768,545 A | 9/1988 | Hoffman |
| 5,294,090 A * | 3/1994 | Winnike .................. 251/36 |
| 6,089,531 A | 7/2000 | Young |
| 6,672,331 B2 | 1/2004 | Heald |
| 7,124,774 B2 * | 10/2006 | Weingarten ............ 137/514.7 |
| 2007/0290154 A1 * | 12/2007 | Aoyama et al. ............ 251/63 |

* cited by examiner

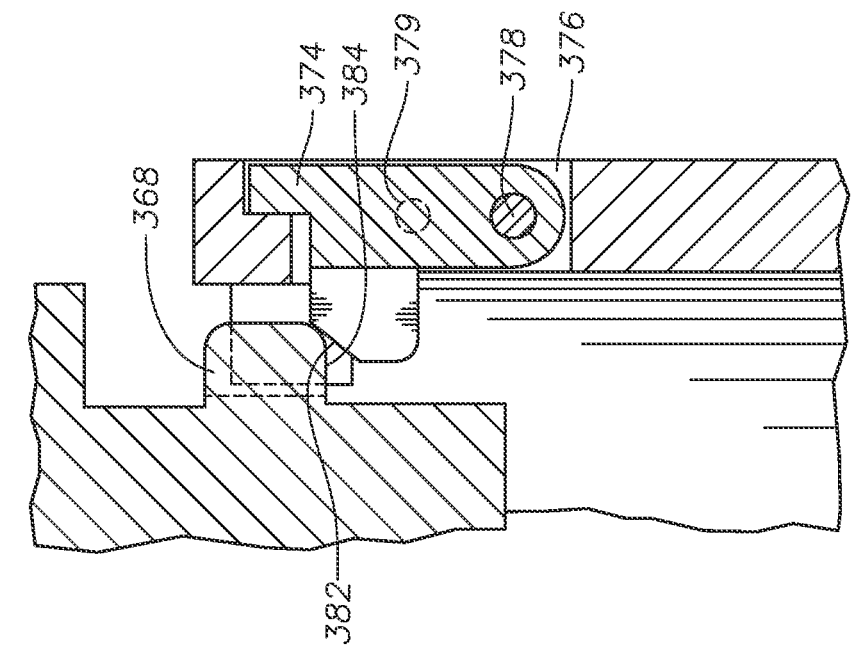
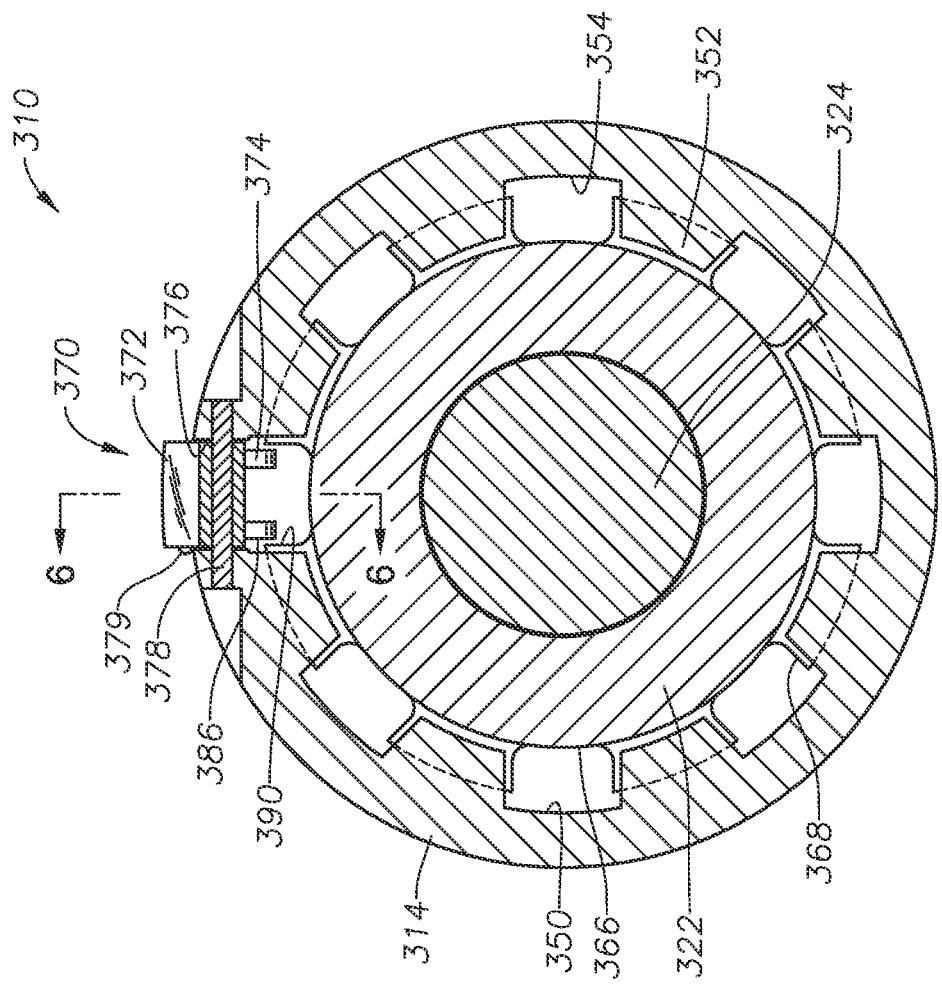

QUICK CONNECT VALVE ACTUATOR

PRIORITY

This application claims priority to U.S. Provisional Patent Application No. 61/747,479 titled "Quick Connect Valve Actuator," filed on Dec. 31, 2012, the disclosure of which is incorporated herein by reference in its entirety.

BACKGROUND OF THE INVENTION

1. Field of the Invention

The present invention relates in general to valves for mineral recovery wells, and in particular to actuators to actuate valves.

2. Brief Description of Related Art

A gate valve is a valve having a body and a bore through the body. A gate is positioned transverse to the body, and moves linearly to obstruct flow through the bore or allow flow through the bore. Some gates have an aperture that aligns with the bore to allow flow. The gate can be normally open, and thus the gate is closed when it is moved linearly to push the aperture out of alignment with the bore. Alternatively, a gate can be normally closed, and thus the gate is opened when it is moved linearly to position the aperture in alignment with the bore. Regardless of whether the gate is normally open or normally closed, the gate is moved, or actuated, by a valve actuator.

The valve actuator is a pneumatic, piston, or hydraulic type actuator that urges a stem toward the valve to either open or close the valve. A bonnet is connected to the valve, with the stem extending through the bonnet, and then the actuator is connected to the bonnet. Valve actuators are typically connected to the bonnet by threaded connections or by bolts through a flange. Threads are expensive to manufacture and are easily damaged. Machining bolt holes in the actuator and drilling and tapping holes into an adapter ring or the bonnet is expensive. Threaded connections also have the disadvantage that the inlet of the actuator rotates about the axis of the actuator during installation. If the actuator is fully tightened and the inlet ends up in the wrong location, the operating supply line to the inlet must be moved.

SUMMARY OF THE INVENTION

This application discloses embodiments of a valve actuator having a housing with a quick connect apparatus for connecting to a mating bonnet, a quick connect apparatus for connecting to a mating piston head assembly, or quick connect apparatus for connecting to both a mating bonnet and a mating piston head assembly. In various embodiments, the valve actuator housing includes a plurality of lugs on an annular surface that pass between a corresponding plurality of lugs on a bonnet annular surface. The housing can then rotate until the lugs are axially aligned, in a locked position, thus preventing axial movement of the housing relative to the bonnet. A latch can then prevent rotational movement of the housing relative to the bonnet so that the housing remains in the locked position. Similarly, a piston head includes a plurality of lugs on an annular surface that pass between a corresponding plurality of lugs on a housing annular surface. The piston head can then rotate until the lugs are axially aligned, in a locked position, thus preventing axial movement of the piston head relative to the housing. A latch can then prevent rotational movement of the piston head relative to the housing so that the piston head remains in the locked position.

More specifically, an actuator side of the bonnet has a flange that has an annular groove machined in the middle of the outer diameter ("OD") of the flange. There are number of slots that are machined in the end of the bonnet that create access channels, or slots, from the end of the bonnet to the groove machined in the bonnet flange. There are a number of locking lugs that are integral to the actuator housing or lower adapter ring. The actuator assembly is lifted over the installed spring assembly and onto the bonnet assembly. The locking lugs align with the slots in the top of the bonnet. The actuator is pushed onto the bonnet until the actuator lugs bottom out on the bottom side of the groove machined in the flange portion of the bonnet.

The actuator is then rotated in any direction until the integral anti-rotation lock aligns with any slot. The anti-rotation lock has a hinge pin that is installed into the actuator housing via a crossed drill hole. There is a small spring loaded pin that is part of the lock and that is depressed and allows the lock to drop into any slot in the bonnet. The depressed spring pin then pops in place in a crossed drilled hole in the actuator housing. The quick connect may also be rotationally locked by using a locking pin rather than an anti-rotational lock.

Embodiments of an actuator include a piston head assembly, also called a power head, that connects to the housing. The piston head has a flange having a groove machined in the OD of the flange. A plurality of slots are machined in the end of the head that create access channels, or slots, from the end of the head to the groove machined in the head. The portion of the flange between the slots are locking lugs. There is also a plurality of locking lugs that are integral to the actuator housing, with a plurality of slots therebetween.

The actuator power head assembly is lifted onto the installed housing. The locking lugs of the housing align with the slots in the bottom of the head. The power head is pushed onto the housing until the lugs bottom out on the back side of the groove machined in the flange portion of the head. The power head is then rotated in either direction until an integral anti-rotation latch aligns with one of the slots. The anti-rotation latch assembly can include a hinge pin that is installed into the actuator housing via a cross-drilled hole. A detent can be used to hold the latch in the latched position. Alternatively, the quick connect housing or power head can be rotationally locked by using a locking pin rather than a latch assembly.

Embodiments of an apparatus for actuating a valve include a cylindrical housing having a valve end and a housing annular surface proximate to the valve end, a valve stem, a portion of the valve stem being positioned within the housing and another portion of the valve stem extending from the valve end of the housing and operable to be connected to a member of valve, such as the gate, the valve stem moving between an extended position and a retracted position, the valve stem extending further from the valve end in the extended position than in the retracted position, and a bonnet operable to be connected to the valve, the stem passing through the bonnet, the housing being detachably connectable to the bonnet by engaging the bonnet and rotating the housing from a released position to a locked position, the housing rotating less than one full revolution between the released and locked positions.

In embodiments, the housing includes a plurality of housing lugs spaced apart around the housing annular surface, the housing lugs protruding from the housing annular surface to define a plurality of slots therebetween. The bonnet includes a plurality of bonnet lugs spaced apart around a bonnet annular surface, the bonnet lugs protruding from the bonnet annular surface to define a plurality of bonnet slots therebetween, each of the housing lugs operable to pass axially through a respective one of the bonnet slots when the housing is in a released position and, after passing through the bonnet slots, the housing being rotatable at least until a portion of one or more of the housing lugs is axially aligned with a portion of a respective bonnet lug such that the bonnet lugs prevent axial movement of the housing in at least one direction.

In embodiments, the bonnet further includes a radial groove having one side defined by an annular shoulder and the other side defined by a surface of the bonnet lugs facing toward the annular shoulder, the housing lugs sliding within the annular groove when moving between the locked position and the released position.

In embodiments, the housing lugs are on an inner diameter surface of the housing and the bonnet lugs are on an outer diameter surface of the bonnet. Embodiments can include a latch assembly, the latch preventing the housing from rotating relative to the bonnet when the housing is in the locked position. The latch assembly can include a latch tab connected to one of the housing and the bonnet, the latch tab being positioned in one of the slots and engaging one or more of the lugs in the locked position to prevent the housing from rotating relative to the bonnet. In embodiments, the latch tab is positioned in an aperture of the housing, the latch tab being pivotable between a latched position and an unlatched position, the latch tab further comprising a latch body having a contour matching an outer diameter contour of the housing in the vicinity of the aperture so that the latch body is flush with the outer diameter contour in the latched position. In embodiments, a gate valve is connected to the bonnet, the gate valve moving between an open position and a closed position in response to movement of the stem.

Embodiments of an apparatus for actuating a valve include a cylindrical housing having a valve end, a piston end, and a piston end annular surface, a plurality of circumferentially spaced apart piston end lugs protruding from the piston end annular surface to define a plurality of piston end slots therebetween. Embodiments can also include a piston head detachably connectable to the piston end of the housing, the piston head having an inlet, a cylindrical piston housing, the piston housing having a plurality of piston housing lugs spaced apart around a piston housing annular surface, the piston housing lugs protruding from the piston housing annular surface to define a plurality of piston housing slots therebetween, each of the piston housing lugs operable to pass axially through a respective one of the piston end slots when the piston head is in a released position and, after passing through the piston end slots, the piston head being rotatable at least until a portion of one or more of the piston housing lugs is axially aligned with a portion of a respective piston end lug such that the piston end lugs prevent axial movement of the piston head in at least one direction to define a locked position. Embodiments can also include a piston within the piston housing, the piston moving between an extended position and a retracted position in response to pressure media from the inlet, the piston being nearer the valve end in the extended position than in the retracted position, a down stop in contact with the piston, the down stop being urged toward the valve end of the housing when the piston moves toward the extended position, and a plurality of housing lugs spaced apart around a housing annular surface, the housing lugs protruding from the housing annular surface to define a plurality of slots therebetween. Embodiments can further include a bonnet operable to be connected to a valve, the bonnet having a plurality of bonnet lugs spaced apart around a bonnet annular surface, the bonnet lugs protruding from the bonnet annular surface to define a plurality of bonnet slots therebetween, each of the housing lugs operable to pass axially through a respective one of the bonnet slots when the housing is in a released position and, after passing through the bonnet slots, the housing being rotatable at least until a portion of one or more of the housing lugs is axially aligned with a portion of a respective bonnet lug such that the bonnet lugs prevent axial movement of the housing in at least one direction to define a locked position. A stem can extend through the bonnet and contact the downstop so that when the downstop is urged toward the valve end, the stem extends further through the bonnet toward the valve.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

FIG. 5 is a sectional view of the connection between the power head and the actuator housing of FIG. 4, taken along the 5-5 line.

FIG. 6 is a sectional view of the latch assembly of FIG. 5, taken along the 6-6 line.

DETAILED DESCRIPTION OF THE PREFERRED EMBODIMENT

The present invention will now be described more fully hereinafter with reference to the accompanying drawings which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout, and the prime notation, if used, indicates similar elements in alternative embodiments.

Figure 1:
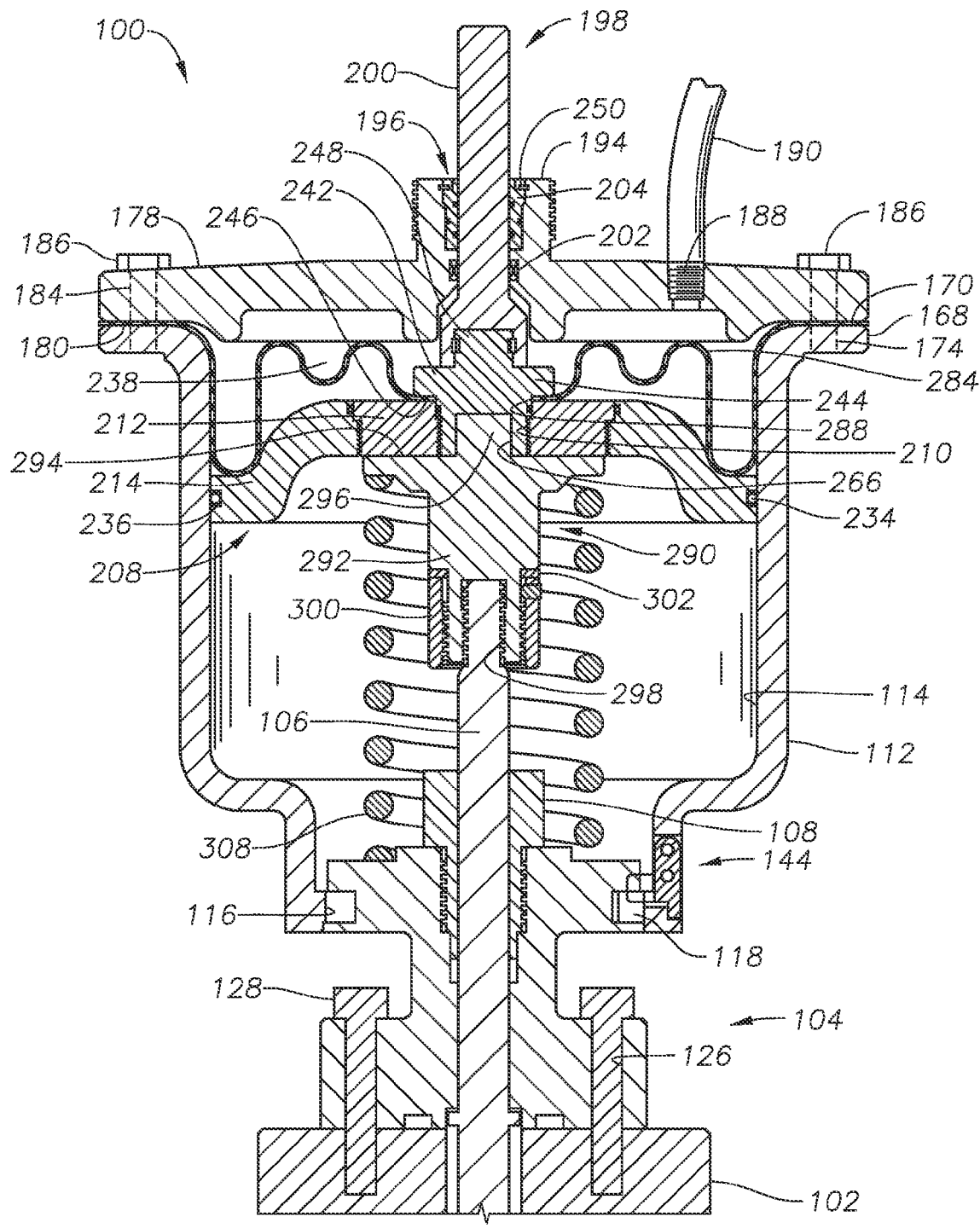
FIG. 1 is a side sectional environmental view of a valve with a valve actuator having a quick connect between the actuator and the bonnet, in accordance with an embodiment of the invention.

Referring to FIG. 1, actuator 100 is shown. Actuator 100 is used to open or close valve 102, to which actuator 100 is connected. Valve 102 is connected to fluid containing members, such as tubular members or a vessel, and selectively limits the flow of fluid therethrough. As one of skill in the art will appreciate, valve 102 can be a gate valve or any other type of valve that is actuated by the extension of a linear member. Bonnet 104 is connected to the body of valve 102. Stem 106 passes through bonnet 104 and packing retainer 108, with the protruding end of stem 106 being operationally connectable to a member, such as a gate, of valve 102. Actuator 100 is used to actuate valve 102 by urging stem 106 downward toward valve 102.

Figure 2:
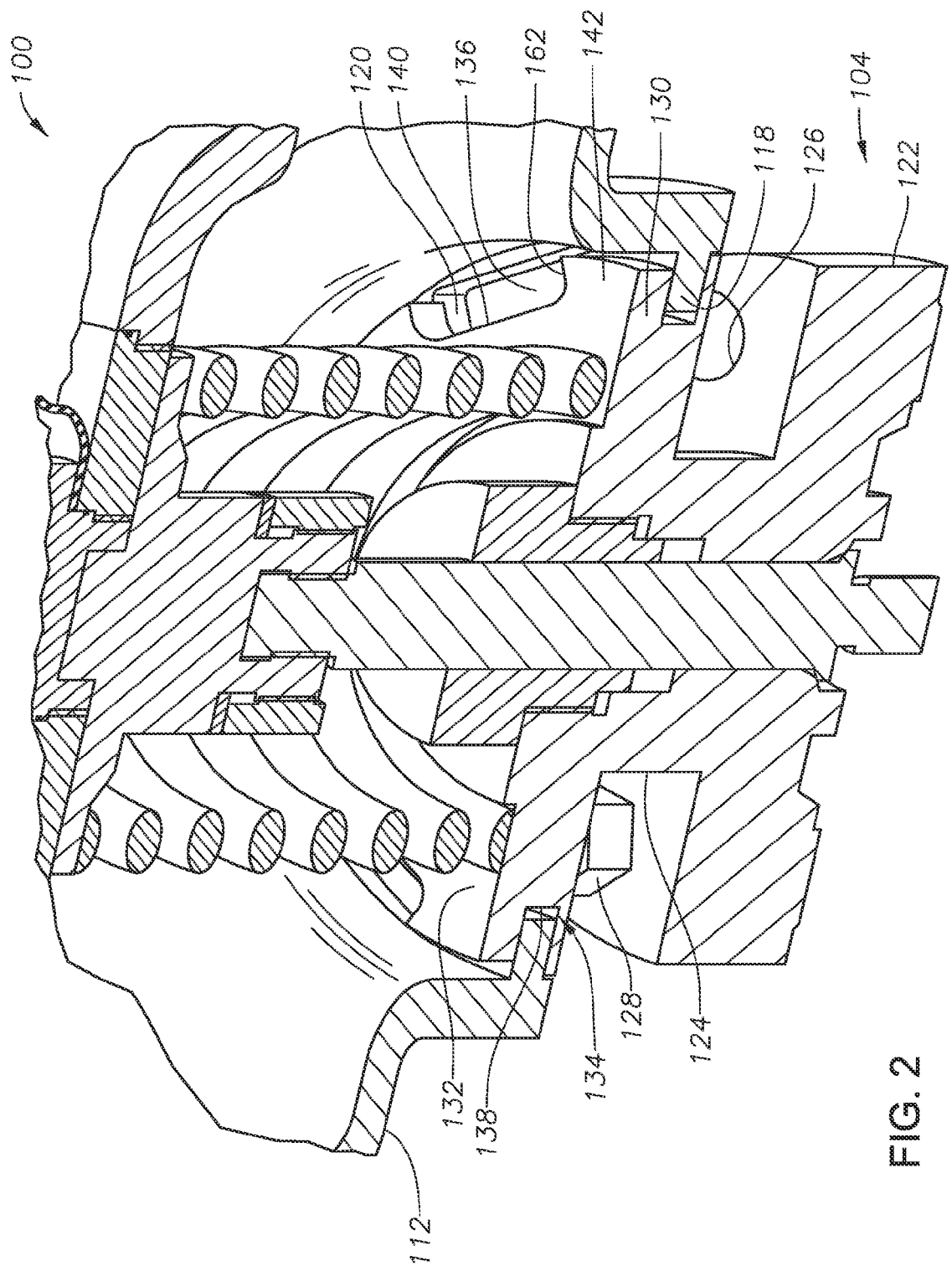
FIG. 2 is an enlarged view of the quick connect of the valve actuator of FIG. 1.

Referring to FIGS. 1 and 2, actuator housing 112 includes a cylindrical body having an inner diameter ("ID") surface 114. Housing 112 is manufactured from any of a variety of techniques including, for example, stamping, extrusion, and casting. In embodiments, housing 112 is free of welds or seams on interior surfaces such as ID surface 114. Housing 112 can be manufactured from NACE certified materials. The lower end of housing 112 includes an opening defined by inner diameter 116. Housing lugs 118 protrude inward from ID 116 and are spaced apart around ID 116 to define slots 120 therebetween. Bonnet 104 and valve 102 prevent the flow of fluid from valve 102 to actuator 100. In other words, there is an absence of fluid communication between valve 102 and actuator 100. In embodiments, actuator housing 112 can be removed from bonnet 104 while fluid is present in valve 102 and no fluid will flow out of valve 102 through bonnet 104 or otherwise.

Bonnet 104 includes lower flange 122 extending radially from bonnet body 124. Lower flange 122 includes bolt holes 126. Bolts 128 pass through bolt holes 126 to connect bonnet 104 to the body of valve 102. At the opposite end of bonnet 104 from lower flange 122, locking flange 130 extends radially from bonnet body 124 and includes top surface 132. The outer diameter of locking flange 130 is less than or about equal to the inner diameter of ID 116 such that ID 116 can fit over locking flange 130.

Groove 134 is an annular groove in the outer diameter of locking flange 130. The lower sidewall of groove 134 defines upward facing shoulder 136. The width of groove 134, which is defined in terms of axial length along the axis of bonnet 104, is greater than or about equal to the axial length of housing lugs 118. The diameter of groove backwall 138 is less than or about equal to the inner diameter defined by housing lugs 118.

Slots 140 are axial slots in the outer diameter of locking flange 130 that extend from top surface 132 to groove 134. A plurality of slots 140 are spaced apart around the circumference of locking flange 130 to define bonnet lugs 142 therebetween. The radial depth of each slot 140 is typically less than or equal to the radial depth of groove 134, but can be greater than the radial depth of groove 134. The circumferential arc length of each slot 140 is approximately equal to or greater than the circumferential arc length of housing lugs 118. Housing lugs 118, thus, are able to pass axially through slots 140. After passing through slots 140, housing lugs 118 are positioned in groove 134 below bonnet lugs 142, but not axially aligned with bonnet lugs 142, in a released position. Housing lugs 118 contact shoulder 136, thus stopping further downward movement of housing 112 relative to bonnet 104. Because housing lugs 118 are axially below bonnet lugs 142, housing 112 can rotate relative to bonnet 104. When housing 112 rotates, relative to bonnet 104, to a position wherein bonnet lugs 142 are axially above housing lugs 118, housing 112 is in a locked position. In the locked position, bonnet lugs 142 prevent upward axial movement of housing lugs 118. In embodiments, less than one revolution of housing 112 is required to move housing 112 from the released to the locked position. In embodiments, housing 112 can move as little as ½, ⅓, ¼, ⅙, ⅛, 1/10, or 1/16, of a revolution, depending on the size and number of lugs, to move from the released to the locked position. As one of skill in the art will appreciate, no fluid from valve 102 is in the vicinity of bonnet lugs 142 and housing lugs 118 and, thus, there can be an absence of seals between the lower end of housing 112 and the upper end of bonnet 104. Therefore, in embodiments, if any fluid is present inside the lower end of housing 102, at least a portion of that fluid can pass through the opening defined by inner diameter 116 and flow to the area outside of housing 102 and outside of bonnet 104.

Figure 3:
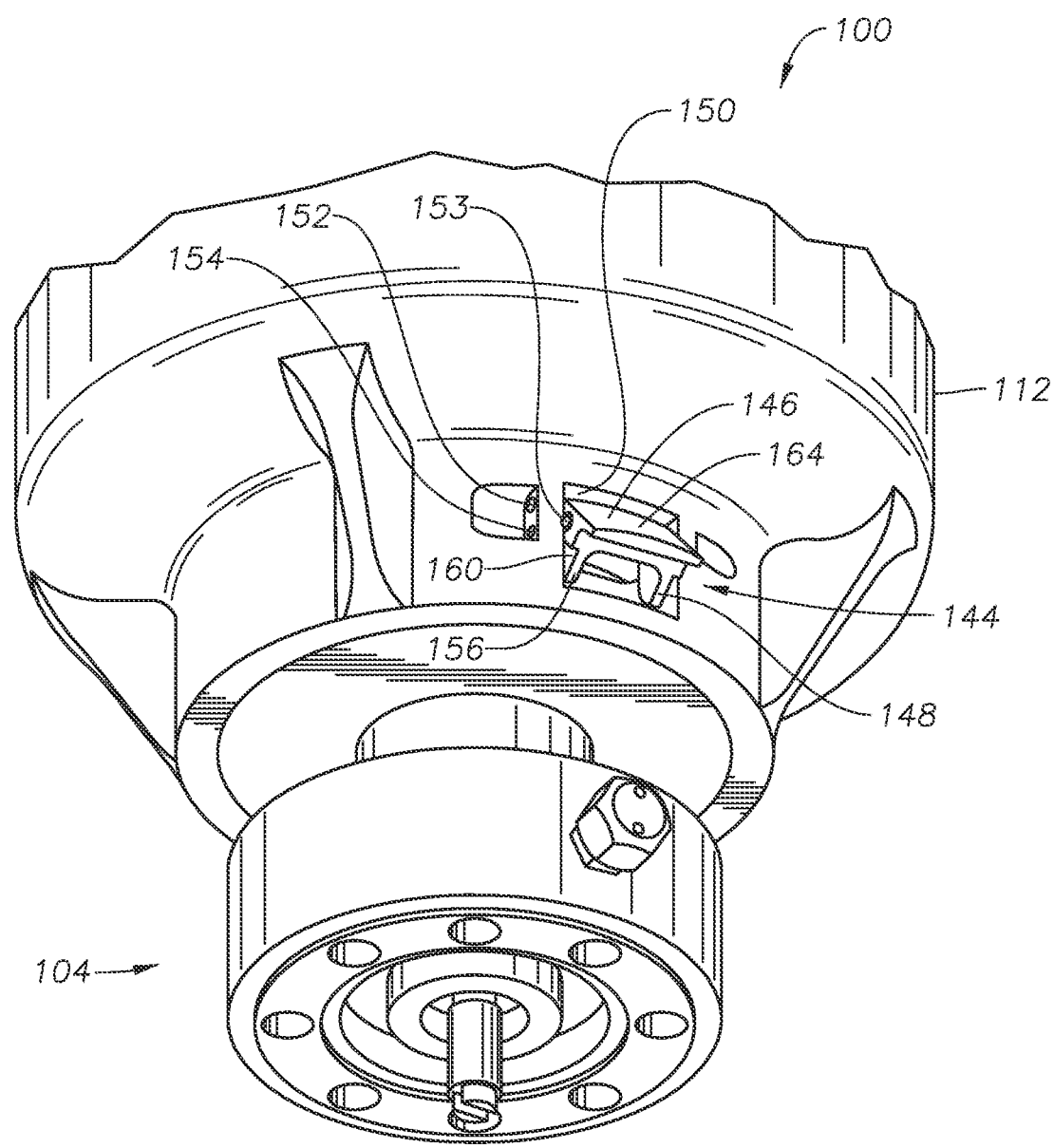
FIG. 3 is an enlarged view of the latch assembly of the valve actuator of FIG. 1.

Referring to FIG. 3, a rotational lock 144 can prevent rotation of housing 112, relative to bonnet 104, when housing 112 is in the locked position. Rotational lock 144 includes latch body 146 having one or more latch tabs 148 protruding inward therefrom when latch body is positioned in latch aperture 150. Latch aperture 150 is an opening through the sidewall of housing 112. In embodiments, no seals are required at aperture 150 because there is an absence of pressurized fluid in housing 112 proximate to aperture 150. Indeed, in embodiments, there is an absence of seals between aperture 150 and latch body 146. Latch body 146 is pivotally connected to housing 112 by pin 152, which passes through a lateral bore, or cross-drilled hole, of body 112. Latch body 146 pivots on pin 152 between an unlatched position and a latched position. Detent 153 is a spring loaded plunger that protrudes from one or both sides of latch body 146. Detent 153 engages lateral bore 154 of body 112 to selectively prevent latch body 146 from pivoting relative to housing 112. When latch body 146 is pivoted radially outward from housing 112, in the unlatched position, detent 153 contacts an outer diameter surface of housing 112 to prevent latch body 146 from pivoting inward to the latched position. As one of skill in the art will appreciate, other mechanisms can be used to hold latch body 146 in place. Latch tab 148 also includes tab sidewalls 160. Latch tab 148 is positioned in housing 112 slightly above housing lugs 118, such that at least a portion of latch tab 148 is in the same axial location as bonnet lugs 142 when housing 112 is landed on bonnet 104.

In embodiments, a spring (not shown) can bias latch body 146 radially inward. A portion of latch tab 148, such as bottom 156, contacts a top edge (not shown in FIG. 3) of bonnet lug 142 when housing 112 is placed on bonnet 104, thus deflecting latch tab 148 radially outward. An edge of bottom 156 can have a taper to facilitate such deflection.

Referring 2 and 3, with latch tab 148 positioned radially outward from housing 112, in the unlatched position, housing lugs 118 land on shoulder 136 and housing 112 is rotated to the locked position. Detent 153 holds latch tab 148 in the radially outward, unlatched position. An operator then depresses detent 153 to allow latch tab 148 to pivot inward to the latched position. When latch tab 148 pivots to a position where detent 153 is aligned with lateral bore 154, a portion of detent 153 is urged by the internal spring (not shown) into lateral bore 154. In this latched position, detent 153 engages lateral bore 154 to hold latch tab 148 in the latched position and thus prevent latch tab 148 from moving to the unlatched position. In the latched position, latch tab sidewalls 160 engage the sidewalls 162 of bonnet lugs 142, thus preventing further rotation of housing 112 in either direction relative to bonnet 104. The outer surface 164 of latch tab 148 is contoured with a radius that generally matches the outer diameter profile of housing 112. Other types of rotational lock 144 can be used. For example, a pin (not shown) can be inserted through an aperture (not shown) of housing 112 into a bore (not shown) of bonnet 104. Or a different type of latch mechanism can be used.

At the opposite end of housing 112, from ID 116, is flange 168, which flares outward from housing 112. Flange 168 has an upward facing surface 170, which is a smooth surface for forming a seal. A plurality of bolt holes 174 are spaced part around flange 168. Cap 178 is connected to housing 112. Cap 178 is an annular plate having an outer diameter approximately equal to the outer diameter of flange 168. Sealing surface 180 is a generally smooth, downward facing surface of cap 178 that aligns with upward facing surface 170 of flange 168. A plurality of bolt holes 184 are spaced apart around cap 178 to align with bolt holes 174. Cap bolts 186 are passed through bolt holes 184 to threadingly engage bolt holes 174 to secure cap 178 to housing 112. Other configurations can be used to secure cap 178 to housing 112, such as bolts that are inserted through bolt holes 174 to threadingly engage bolt holes 184, bolts that pass through both members and are secured with nuts (not shown), clamps (not shown), or collars (not shown).

Inlet 188 is an orifice through cap 178 and is spaced inwardly from sealing surface 180. Inlet 188 is connected to a pressurized media fluid source that can selectively provide pressurized media fluid through inlet 188. The pressurized media fluid source includes rigid or flexible tubing or pipe 190. Pressurized media is typically a fluid such as compressed air, nitrogen, well gas, or other types of gas or liquid.

Indicator housing 194 is a housing that includes indicator orifice 196 for receiving indicator stem 198. Indicator stem 198 includes a cylindrical shaft 200 that protrudes through cap 178. Bearing 202 is a bearing surface on an ID of indicator orifice 196 for guiding stem 198. Sealing assembly 204 is a seal that dynamically seals around indicator stem shaft 200. Alternatively, sealing assembly 204 can be a sealing cartridge, a v-shaped lip seal with an o-ring, or other types of seals for dynamically sealing around a shaft.

Plate 208 is an annular plate positioned in housing 112. Plate 208 is generally perpendicular to the axis of housing 112. Plate 208 can span the inner diameter of housing 112 and slidingly or sealingly engage the inner diameter surface of housing 112. Alternatively, plate 208 can span a portion of the inner diameter of housing 112 but not extend to the inner diameter surface. Plate 208 includes a central bore 210. The surface of plate 208 has a contour such that the radially outward portions are axially below the radially inward portions. As shown in FIG, 1, the outer diameter region of the plate is located axially nearer the valve end of the housing than the central portion of the plate. In embodiments, plate 208 has an upward facing convex surface and an upward facing concave surface, with the concave surface being spaced radially outward from the convex surface. Alternatively, plate 208 can have another shape such as, for example, a generally flat shape.

Plate 208 includes hub 212 and outer plate 214. Hub 212 includes central bore 210, having ID threads on an ID surface. Hub 212 also includes a sealing surface on an ID of central bore 210. The outer diameter of hub 212 includes OD threads and an OD sealing surface. Outer plate 214 is an annular ring that connects to hub 212, such that plate 208 includes outer plate 214 and hub 212. The upper surface of outer plate 214 slopes downward and outward, with a generally convex shape, and then extends horizontally to ID surface 114. The ID bore of outer plate 214 includes ID threads for threadingly engaging OD threads of hub 212. A seal is positioned in a seal groove on the bore of outer plate 214, and sealingly engages the OD sealing surface of hub 212. Sidewall seal 234 is positioned in groove 236 located on an outer diameter of outer plate 214, and thus is located on an outer diameter of plate 208. Sidewall seal 234 sealingly engages ID surface 114 of housing 112 to provide a dynamic seal between ID surface 114 and plate 208. In embodiments, a wear ring (not shown in FIG, 1) can be positioned in groove 236. As one of skill in the art will appreciate, a wear ring will reduce the friction between the outer diameter of plate 208 and ID surface 114 of housing 112. The wear ring (not shown in FIG, 1) does not have the same sealing properties as sidewall seal 234.

The space bounded by housing 112, plate 208, and cap 178 is defined as a pressure chamber 238. Fluid introduced through inlet 188 results in an increase in pressure, which causes plate 208 to move downward. Alternatively, a conventional plate, which can have a generally flat shape, and that does not extend to ID surface 114, and a conventional diaphragm can be used.

Coupling 242 is detachably connected to the center of plate 208. Coupling 242 includes a cylindrical body 244, a shoulder 246, and an upper body 248. Body 242 threadingly engages bore 210 of plate 208. Stem 198 is detachably connected to upper body 248 by way of a snap ring 250 that resides in corresponding grooves on each of a bore on the lower end of stem 198 and on the outer diameter of upper body 248. A downward facing cylindrical bore 266 is located in the lower end of body 244. Alternatively, a conventional seal nut (not shown) and stem can be used.

Diaphragm 284 is a flexible diaphragm extending at least from ID surface 114 to coupling 242. As shown in FIG, 1, diaphragm 284 is positioned between sealing surface 180 of cap 178 and surface 170 of flange 168. Bolt hole openings can be spaced apart around diaphragm 284, in alignment with cap bolts 186, so that cap bolts 186 pass through diaphragm 284 when it is positioned between cap 178 and flange 168. Cap bolts 186 are torqued to urge each sealing surface toward diaphragm 284. Diaphragm 284, thus, acts as a seal by sealingly engaging each of the sealing surfaces 180, 170.

An inner diameter orifice 288 is located at the center of diaphragm 284. The lower portion of coupling 242 passes through orifice 288 to engage the threads of central bore 210. The surfaces of diaphragm 284 are positioned between shoulder 246 of coupling 242 and plate 208. As shown in FIG, 1, an upward facing surface of hub 212 sealingly engages a lower surface of diaphragm 284, and shoulder 246 sealingly engages an upper surface of diaphragm 284. As coupling 242 is tightened toward plate 208, diaphragm 284 is compressed between them plate 208 and shoulder 246. When diaphragm 284 is in position, pressure chamber 238 is defined by diaphragm 284 and cap 178.

Down stop 290 is a cylindrical member for transmitting axial force between plate 208 and stem 106. Down stop 290 includes cylindrical body 292 and shoulder 294 extending therefrom. The upward facing surface of shoulder 294 contacts the downward facing surface of plate 208. Nipple 296 extends axially from the upper end of down stop 290. When actuator 100 is assembled, nipple 296 is positioned in bore 266, thus concentrically aligning both members.

The lower end of down stop 290 includes threaded bore 298, which has threads on an ID surface, for threadingly engaging a threaded end of stem 106. As one of skill in the art will appreciate, the connection between down stop 290 and stem 106 can be any of various types of connections and is not limited to threaded connections. The outer diameter of the lower end of down stop 290 includes threaded collar 300 and can include any number of spacer rings 302. Threaded collar 300 contacts another member, such as packing retainer 108, located at the lower end of housing 112, to stop the further downward travel of down stop 290. Threaded collar 300 is adjusted so that it stops downward movement, and thus stem 106, at the appropriate position to completely open or completely close valve 102. Spacer rings 302 can be added or removed so that an opening of the gate (not shown) of gate valve 102 is properly aligned with a passage (not shown) of gate valve 102. A set screw is used to hold threaded collar 300 in position.

Spring 308 surrounds down stop 290 and at least a portion of stem 106, and generally extends from the top of bonnet 104 to the downward facing surface of shoulder 294. Spring 308 is compressed as plate 208 moves from the upper position to the lower position. When fluid pressure from inlet 188 is reduced, spring 308 urges plate 208 up, away from valve 102. As one of skill in the art will appreciate, fluid force within valve 102 can act on stem 106 inside of valve 102 to urge stem 106 upward. Spring 308 and the upward force on the stem 106 can work together or independently to move plate 208 up.

In operation, bonnet 104 is connected to valve 102 by bolts 128. Stem 106 extends upward through packing retainer 108 from bonnet 104. Downstop 290 is threadingly connected to stem 106, and spring 308 is positioned between downstop 290 and bonnet 104 to urge downstop 290 upward. The actuator upper assembly, which includes housing 112, plate 208, diaphragm 284, stem 198, coupling 242, and cap 178, is assembled. The actuator upper assembly is placed on bonnet 104. As the actuator upper assembly is lowered onto bonnet 104, each of the housing lugs 118 pass through a respective slot 140 and then housing lugs 118 land on shoulder 136 of groove 134. Axial movement of housing 112, relative to bonnet 104, is not yet restrained, so housing 112 is in a released position. As the actuator upper assembly, including housing 112, moves downward, latch tab 148 contacts one of the bonnet lugs 142, causing latch tab 148 to pivot radially outward.

When housing lugs 118 land on shoulder 136, latch tab 148 remains in contact with one of the bonnet lugs 142 and remains pivoted outward. The actuator upper assembly is then rotated, relative to bonnet 104, with housing lugs 118 rotating along groove 134, until at least a portion of each housing lug 118 is axially aligned with at least a portion of a respective bonnet lug 142. Upper actuator assembly is thus rotated from the released position to a locked position. Bonnet lugs 142, thus, resist upward movement of housing lugs 118, and shoulder 136 resists downward movement of housing lugs 118, thereby preventing axial movement of the actuator upper assembly relative to bonnet 104. Nipple 296 enters bore 266, and plate 208 lands on downstop 290 as housing 112 lands on bonnet 104.

As housing 112 rotates relative to bonnet 104, latch tab 148 rotates along the bonnet lug 142 with which it is in contact until latch tab 148 is no longer radially aligned with that bonnet lug 142. Once latch tab 148 clears the bonnet lug 142 and detent 153 is depressed, latch tab 148 pivots inward to a latched position. Upon pivoting inward, latch tab 148 is held in the latched position by detent 153 engaging lateral bore 154, and is positioned in a slot 140 between two bonnet lugs 142. Tab sidewalls 160 contact a surface of each of the respective bonnet lugs 142, thus preventing rotation of housing 112 relative to bonnet 104. In embodiments, latch body 146 has an outer surface 164 with a profile that generally matches the outer diameter profile of housing 112 in the vicinity of latch aperture 150. When latch tab 148 is in the latched position, the outer diameter contour of outer surface 164 is generally flush with the outer diameter surface of housing 112 in the vicinity of latch aperture 150.

To remove the actuator upper assembly, a tool (not shown), such as a thin rod or a screwdriver, is inserted into lateral bore 154 and used to depress detent 153, thus urging detent 153 out of lateral bore 154. With detent 153 no longer engaging lateral bore 154, latch body 148 is urged outward, out of the latched position and into an unlatched position, by, for example, engaging a flat tool under the lower edge of latch body. In the unlatched position, latch tab 148 is no longer radially aligned with bonnet lugs 142. The actuator upper assembly, thus, can be rotated, relative to bonnet 104, until housing lugs 118 are axially aligned with bonnet slots 140, at which point the actuator upper assembly can be lifted off of bonnet 104. Housing lugs 118 pass through slots 140 as the actuator upper assembly is removed.

As shown in FIG. 1, inlet 188 is radially offset from the center of cap 178. If tubing 190 is rigid tubing or pipe, or flexible tubing that is less than a certain length, inlet 188 must be aligned with tubing 190 when housing 112 is in the locked position so that tubing 190 can be connected to inlet 188. Housing 112 needs to rotate, at most, the arc length of one lug to move from the released position to the latched position. If there are, for example, eight housing lugs 118 and eight bonnet lugs 142, with eight each housing slots 120 and bonnet slots 140 between them, respectively, the housing rotates approximately $1/16^{th}$ of a turn to move from the released to the locked position. This enables the operator to determine the final position of inlet 188 at the time that housing 112 is placed on bonnet 104. In embodiments, inlet 188 rotates between approximately 1 and 180 degrees when housing 112 is moved between the released and locked position. In embodiments, inlet 188 rotates between approximately 10 and 90 degrees when housing 112 is moved between the released and locked position. In embodiments, inlet 188 rotates between approximately 15 and 45 degrees when housing 112 is moved between the released and locked position. In embodiments, inlet 188 rotates between approximately 22 and 30 degrees when housing 112 is moved between the released and locked position. If latch tab 148 is held in the unlatched position, housing 112 can rotate through one or more locked and unlocked positions and, after releasing latch tab 148, reaching the next locked position and being latched in place.

After housing 112 is connected to bonnet 104, valve 102 is actuated by introducing pressurized media through inlet 188 into pressure chamber 238. The pressurized media exerts downward force on diaphragm 284 and plate 208, which urges plate 208, downstop 290, and stem 106 downward to actuate valve 102. As plate 208 moves downward, coupling 242, being connected to plate 208, also moves downward. Indicator stem 198, being connected to coupling 242, also moves downward. From the exterior of actuator 100, the extension and retraction of stem 198 provides a visual indication of the position of plate 208 and, thus, the state of valve 102.

Figure 4:
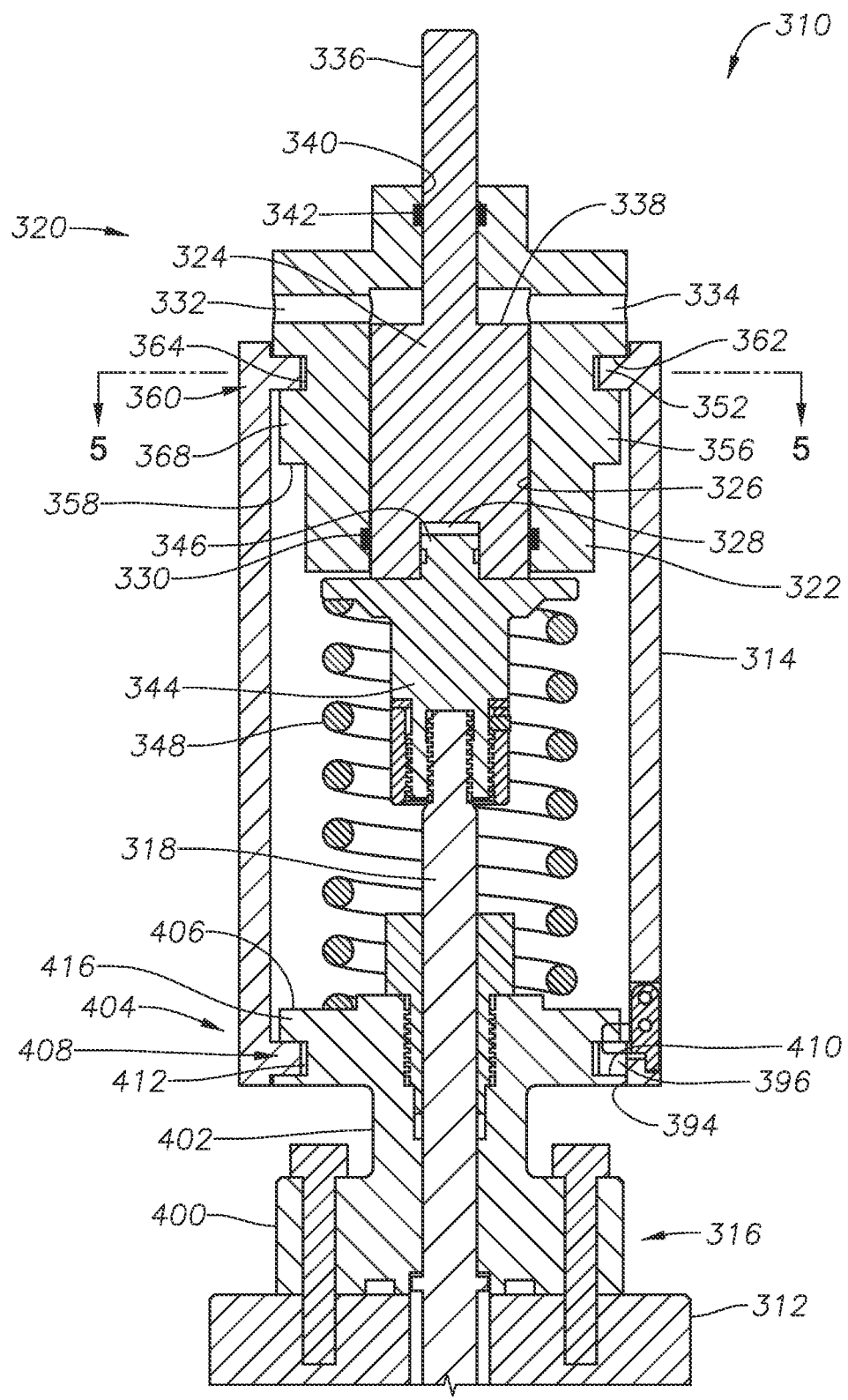
FIG. 4 is a side sectional environmental view of a valve with a power head valve actuator and a quick connect between the housing and each of the power head and the bonnet in accordance with an embodiment of the invention.

Referring now to FIG. 4, actuator 310 is a piston type actuator for actuating valve 312. Actuator 310 includes housing 314, which is detachably connected to bonnet 316. Valve stem 318 extends downward through housing 314 and actuates valve 312. Piston head 320, also called a power head, is detachably connected to housing 314. Piston head 320 includes a cylindrical body 322. Piston 324 is positioned within piston chamber 326 of body 322. A cylindrical bore 328 is located in a lower end of piston 324. Seals 330 form a seal between the body of piston 324 and an inner diameter of body 322. Port 332 and port 334 are each apertures through body 322 in communication with piston chamber 326. Ports 332 is used to introduce pressurized media into piston chamber 326. Port 334 can be used as an inlet or as an outlet for releasing media from piston chamber 326. Port 334 can be capped, connected to an outlet line, and can include a pressure relief device. Indicator stem 336 extends upward from upward facing surface 338 of piston 324. Indicator stem 336 extends through orifice 340 at the top of body 322. Seal assembly 342 forms a seal between orifice 340 and Indicator stem 336.

Downstop 344 is in contact with a lower surface of piston 324. Nipple 346 extends upward from the center of downstop 344 and is positioned within bore 328 at the base of piston 324. Stem 318 is connected to downstop 344, so that downward movement of piston 324, via downstop 344, urges stem 318 downward. Spring 348 urges downstop 344, and thus stem 318 and piston 324, upward.

Referring to FIGS. 4 and 5, the upper end of housing 314, which can be considered the piston end, includes an opening defined by inner diameter 350. Housing lugs 352 protrude inward from ID 350 and are spaced apart around ID 350 to define slots 354 therebetween. Piston head body 322 includes locking flange 356 extending radially from body 322. The outer diameter of locking flange 356 is less than or about equal to the inner diameter of ID 350 such that ID 350 can fit onto locking flange 356. Flange 356 includes downward facing surface 358.

Groove 360 is an annular groove in the outer diameter of locking flange 356. The upper sidewall of groove 360 defines downward facing shoulder 362. The width of groove 360, which is defined in terms of axial length along the axis of body 322, is greater than or about equal to the axial length of housing lugs 352. The diameter of groove backwall 364 is less than or about equal to the inner diameter of housing lugs 352.

Slots 366 are axial slots on the outer diameter of locking flange 356 that extend from downward facing surface 358 of flange 356 to groove 360. A plurality of slots 366 are spaced apart around the circumference of locking flange 356 to define head lugs 368 therebetween. The radial depth of each slot 366 is typically less than or equal to the radial depth of groove 360, but can be greater than the radial depth of groove 360. The circumferential arc length of each slot is approximately equal to or greater than the circumferential arc length of housing lugs 352. Housing lugs 352, thus, are able to pass axially through slots 366. After passing through slots 366, housing lugs 352 are positioned in groove 360 above head lugs 368. Housing lugs 352 contact shoulder 362, thus stopping further downward movement of body 322 relative to housing 314. Because housing lugs 352 are axially above head lugs 368, piston head 320 can rotate relative to housing 314. When piston head 320 rotates, relative to housing 314, to a position wherein head lugs 368 are axially below housing lugs 352, piston head 320 is in a locked position. In the locked position, housing lugs 352 prevent upward axial movement of head lugs 368.

A rotational lock 370 can prevent rotation of piston head 320, relative to housing 314, when piston head 320 is in the locked position. Rotational lock 370 includes latch body 372 having one or more latch tabs 374 protruding inward therefrom when latch body 372 is positioned in latch aperture 376. Latch aperture 376 being an aperture through the sidewall of housing 314. Latch body 372 is pivotally connected to housing 314 by pin 378 which passes through a lateral bore, or cross-drilled hole, of housing 314. Latch body 372 pivots on pin 378 between a latched position and an unlatched position. Detent 379 is a spring loaded plunger that protrudes from one or both sides of latch body 372. Detent 379 engages a lateral bore (not shown) of housing 314 to selectively prevent latch body 372 from pivoting relative to housing 314. When latch body 372 is pivoted radially outward from housing 314, in the unlatched position, detent 379 contacts an outer diameter surface of housing 314 to prevent latch body 372 from pivoting inward to the latched position. Latch tab 374 also includes tab sidewalls 386. Latch tab 374 is positioned in housing 314 slightly above housing lugs 352, such that at least a portion of latch tab 374 is in the same axial location as head lugs 368.

Referring now to FIG. 6, in embodiments, latch tab 374 includes a tapered top 382 that faces upward and inward when latch tab 374 is positioned in latch aperture 376. Tapered top 382 contacts a bottom edge 384 of head lug 368 when piston head 320 is placed on housing 314, thus deflecting latch tab 374 radially outward.

Referring back to FIGS. 4 and 5, when shoulder 362 lands on housing lugs 352 and housing 314 is rotated to the locked position, latch tab 374 clears the head lug 368 with which it is radially located, latch tab 374 being held in the unlatched position by detent 379 contacting an outer diameter surface of housing 314. An operator then depresses detent 379 to allow latch tab 374 to pivot inward to the latched position. Once in the latched position, detent 379 is urged into lateral bore (not shown) of housing 314 by a spring (not shown). In the latched position, latch tab sidewalls 386 engage the sidewalls 390 of head lugs 368, thus preventing further rotation of piston head 320 in either direction relative to housing 314. The outer surface 372 of rotational lock 370 is contoured with a radius that generally matches the outer diameter profile of housing 314.

Other types of rotational lock 370 can be used. For example, a pin (not shown) can be inserted through an aperture (not shown) of housing 314 into a radial bore (not shown) of piston head 320. Or a different type of latch mechanism can be used.

Figure 7:
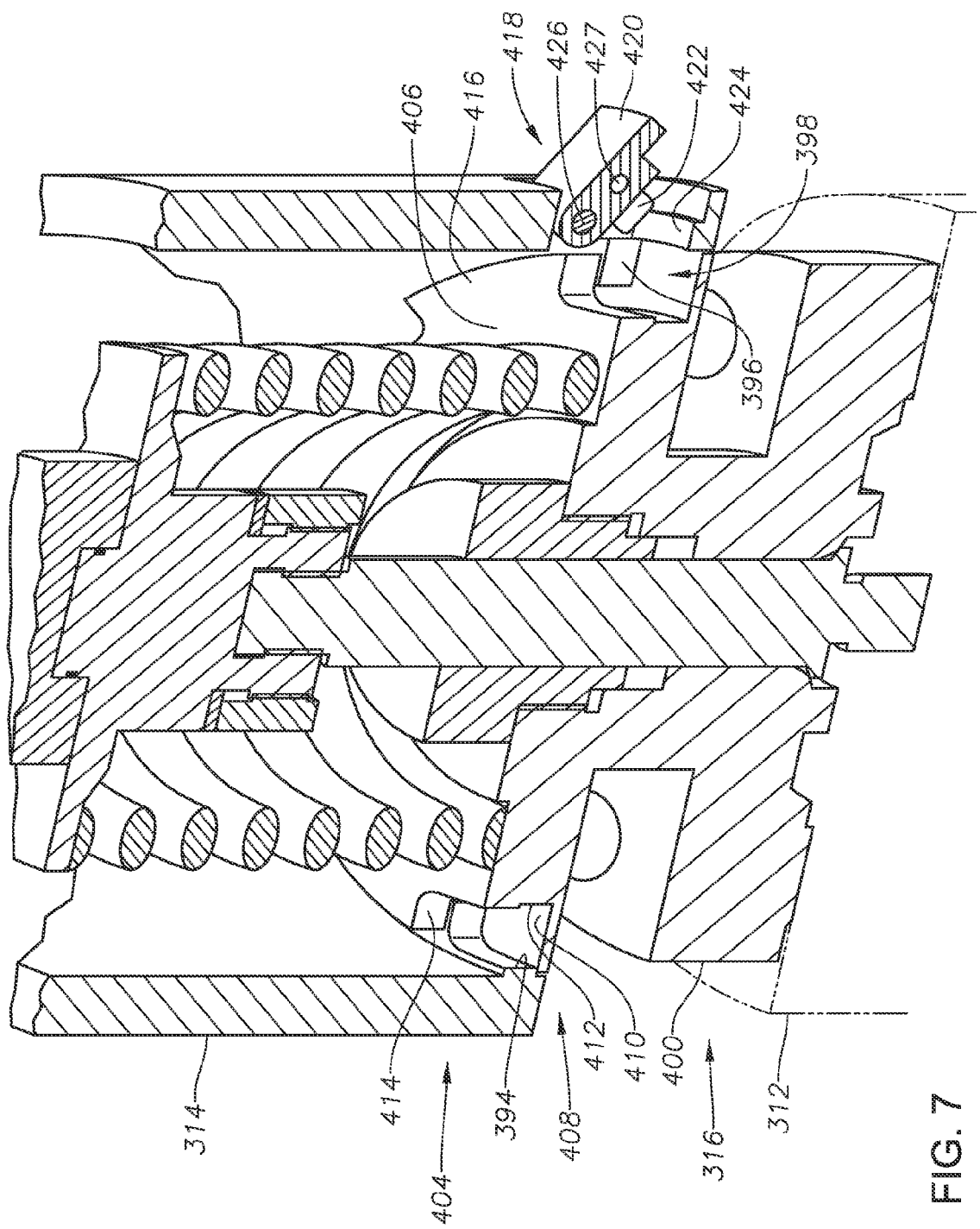
FIG. 7 is an enlarged view of the quick connect between the actuator and the bonnet, of FIG. 4.

FIGS. 4 and 7 show a quick connect type of connection between housing 314 and bonnet 316. Other types of housing-to-bonnet connections can be used with the quick disconnect piston head 320. The lower end of housing 314, which can be considered the valve end, includes an opening defined by inner diameter 394. Housing lugs 396 protrude inward from ID 394 and are spaced apart around ID 394 to define slots 398 therebetween. Bonnet 316 includes lower flange 400 extending radially from bonnet body 402. Lower flange 400 is connected to the body of valve 312 by, for example, bolts (not shown in FIG. 4). At the opposite end of bonnet 316 from lower flange 400, locking flange 404 extends radially from bonnet body 402 and includes top surface 406. The outer diameter of locking flange 404 is less than or about equal to the inner diameter of ID 394 such that ID 394 can fit over locking flange 404.

Groove 408 is an annular groove in the outer diameter of locking flange 404. The lower sidewall of groove 408 defines upward facing shoulder 410. The width of groove 408, which is defined in terms of axial length along the axis of bonnet 316, is greater than or about equal to the axial length of housing lugs 396. The diameter of groove backwall 412 is less than or about equal to the inner diameter of housing lugs 396.

Slots 414 are axial slots in the outer diameter of locking flange 404 that extend from top surface 406 to groove 408. A plurality of slots 414 are spaced apart around the circumference of locking flange 404 to define bonnet lugs 416 therebetween. The radial depth of each slot 414 is typically less than or equal to the radial depth of groove 408, but can be greater than the radial depth of groove 408. The circumferential arc length of each slot is approximately equal to or more than the circumferential arc length of housing lugs 396. Housing lugs 396, thus, are able to pass axially through slots 414. After passing through slots 414, housing lugs 396 are positioned in groove 408 below bonnet lugs 416. Housing lugs 396 contact shoulder 410, thus stopping further downward movement of housing 314 relative to bonnet 316. Because housing lugs 396 are axially below bonnet lugs 416, housing 314 can rotate relative to bonnet 316. When housing 314 rotates, relative to bonnet 316, to a position wherein bonnet lugs 416 are axially above housing lugs 396, housing 314 is in a locked position.

In the locked position, bonnet lugs 416 prevent upward axial movement of housing lugs 396.

A rotational lock 418 can prevent rotation of housing 314, relative to bonnet 316, when housing 314 is in the locked position. Rotational lock 418 includes latch body 420 having latch tab 422 protruding inward therefrom when latch body is positioned in latch aperture 424. Latch body 420 is pivotally connected to housing 314 by pin 426. Latch body 420 pivots on pin 426 between an unlatched position and a latched position. A detent 427 engages a lateral bore of housing 314 (not shown in FIG. 7) to hold latch tab 422 in the latched position.

Latch tab 422 can include a tapered bottom that faces downward and inward when latch tab 422 is positioned in latch aperture 424. The tapered bottom can contacts a the top edge of bonnet lug 416 when housing 314 is placed on bonnet 316, thus deflecting latch tab 422 radially outward. Latch tab 422 is positioned in housing 314 slightly above housing lugs 396, such that at least a portion of latch tab 422 is in the same axial location as bonnet lugs 416.

When housing lugs 396 land on shoulder 410 and housing 314 is rotated to the locked position, latch tab 422 is released by depressing detent 427, and latch tab 422 can then move into a latched position wherein at least a portion of latch tab 422 is in slot 414. Detent 427 can engage lateral bore (not shown) to hold latch tab 422 in the latched position. In the latched position, latch tab sidewalls engage the sidewalls of housing lugs 396, thus preventing further rotation of housing 314 in either direction relative to bonnet 316. The outer surface of latch body 420 is contoured with a radius that generally matches the outer diameter profile of housing 314.

Other types of rotational lock 418 can be used. For example, a pin (not shown) can be inserted through an aperture (not shown) of housing 314 into a bore (not shown) of bonnet 316. Or a different type of latch mechanism can be used.

In embodiments, the ends of housing 314 are interchangeable such that housing 314 can be reversed during installation. In other words, the opening diameters, lug sizes, slot sizes, and other functional parts used to connect to each of piston head 320 and bonnet 316 are substantially identical. In embodiments, the valve end of housing 314 and the piston end of housing 314 are substantially similar so that each of the valve end and the piston end are operable to be connected to one of the piston head and the bonnet.

While the invention has been shown or described in only some of its forms, it should be apparent to those skilled in the art that it is not so limited, but is susceptible to various changes without departing from the scope of the invention.

What is claimed is:

1. A system for actuating a valve, the apparatus comprising:
    a cylindrical housing having a valve end and a housing annular surface proximate to the valve end;
    a valve stem, a portion of the valve stem being positioned within the housing and being unsecured in a longitudinal direction within the housing relative to a sealed pressure chamber within the housing, and another portion of the valve stem extending from the valve end of the housing and operable to be connected to a valve, the valve stem moving between an extended position and a retracted position, the valve stem extending further from the valve end in the extended position than in the retracted position; and
    a bonnet operable to be connected to the valve, the valve stem passing through the bonnet and limited in the longitudinal direction by the bonnet, the housing being detachably connectable to the bonnet by engaging the bonnet and rotating the housing from a released position to a locked position, the housing rotating less than one full revolution between the released and locked positions, the housing maintaining the sealed pressure chamber in the released position and when detached from the bonnet and separated from the valve stem.

2. The system according to claim 1, wherein the housing comprises a plurality of housing lugs spaced apart around the housing annular surface, the housing lugs protruding from the housing annular surface to define a plurality of slots therebetween; and
    the bonnet comprises a plurality of bonnet lugs spaced apart around a bonnet annular surface, the bonnet lugs protruding from the bonnet annular surface to define a plurality of bonnet slots therebetween, each of the housing lugs operable to pass axially through a respective one of the bonnet slots when the housing is in a released position and, after passing through the bonnet slots, the housing being rotatable at least until a portion of one or more of the housing lugs is axially aligned with a portion of a respective bonnet lug such that the bonnet lugs prevent axial movement of the housing in at least one direction.

3. The system according to claim 1, further comprising a latch assembly, the latch preventing the housing from rotating relative to the bonnet when the housing is in the locked position.

4. The system according to claim 3, wherein the latch assembly comprises a latch tab connected to one of the housing and the bonnet, the latch tab being positioned in one of the slots and engaging one or more of the lugs in the locked position to prevent the housing from rotating relative to the bonnet.

5. The system according to claim 4, wherein the latch tab is positioned in an aperture of the housing, the latch tab being pivotable between a latched position and an unlatched position, the latch tab further comprising a latch body having a contour matching an outer diameter contour of the housing in the vicinity of the aperture so that the latch body is substantially flush with the outer diameter contour in the latched position.

6. The system according to claim 1, further comprising
    a plate positioned within the housing and spanning at least a portion of the inner diameter of the housing;
    a diaphragm spanning the diameter of the housing, the diaphragm being at least partially supported by the plate; and
    a down stop in contact with the plate and connected to the stem, wherein pressurized media through an inlet urges the diaphragm toward the valve end, and the diaphragm urges the plate and downstop toward the valve end to urge the stem toward the extended position.

7. The system according to claim 6, wherein the plate spans the inner diameter of the housing and further comprising a seal between the plate and the housing.

8. The system according to claim 1, further comprising a piston within the housing, the piston moving axially within the housing in response to pressure media from an inlet, the piston causing the stem to move from the retracted position to the extended position.

9. The system according to claim 1, further comprising a valve assembly connected to the bonnet, the valve assembly movable between an open position and a closed position in response to movement of the stem and wherein there is an absence of fluid communication between the valve assembly and the housing.

10. An apparatus for actuating a valve, the apparatus comprising:
- a cylindrical housing having a valve end, a piston end, and a piston end annular surface, a plurality of circumferentially spaced apart piston end lugs protruding from the piston end annular surface to define a plurality of piston end slots therebetween;
- a piston head detachably connectable to the piston end of the housing, the piston head comprising:
  - an inlet,
  - a cylindrical piston housing, the piston housing having a plurality of piston housing lugs spaced apart around a piston housing annular surface, the piston housing lugs protruding from the piston housing annular surface to define a plurality of piston housing slots therebetween, each of the piston housing lugs operable to pass axially through a respective one of the piston end slots when the piston head is in a released position and, after passing through the piston end slots, the piston head being rotatable at least until a portion of one or more of the piston housing lugs is axially aligned with a portion of a respective piston end lug such that the piston end lugs prevent axial movement of the piston head in at least one direction to define a locked position, and
  - a piston within the piston housing, the piston moving between an extended position and a retracted position in response to pressure media from the inlet, the piston being nearer the valve end in the extended position than in the retracted position;
- a down stop in contact with the piston, the down stop being urged toward the valve end of the housing when the piston moves toward the extended position;
- a plurality of housing lugs spaced apart around a housing annular surface, the housing lugs protruding from the housing annular surface to define a plurality of slots therebetween;
- a bonnet operable to be connected to a valve, the bonnet having a plurality of bonnet lugs spaced apart around a bonnet annular surface, the bonnet lugs protruding from the bonnet annular surface to define a plurality of bonnet slots therebetween, each of the housing lugs operable to pass axially through a respective one of the bonnet slots when the housing is in a released position and, after passing through the bonnet slots, the housing being rotatable at least until a portion of one or more of the housing lugs is axially aligned with a portion of a respective bonnet lug such that the bonnet lugs prevent axial movement of the housing in at least one direction to define a locked position, wherein the housing maintains a sealed pressure chamber in the released position and when detached from the bonnet; and
- a stem, the stem extending through the bonnet and contacting the downstop so that when the downstop is urged toward the valve end, the stem extends further through the bonnet toward the valve.

11. The apparatus according to claim 10, wherein the valve end and the piston end are substantially similar so that each of the valve end and the piston end are operable to be connected to one of the piston housing and the bonnet.

12. The apparatus according to claim 10, wherein the bonnet further comprises a radial groove having one side defined by an annular shoulder and the other side defined by a surface of the bonnet lugs facing toward the annular shoulder, the housing lugs sliding within the annular groove when moving between the locked position and the released position.

13. The apparatus according to claim 10, wherein the housing lugs are on an inner diameter surface of the housing and the bonnet lugs are on an outer diameter surface of the bonnet.

14. The apparatus according to claim 10, further comprising a latch assembly, the latch preventing the housing from rotating relative to the bonnet when the housing is in the locked position.

15. The apparatus according to claim 14, wherein the latch assembly comprises a latch tab connected to one of the housing and the bonnet, the latch tab being positioned in one of the slots and engaging one or more of the lugs in the locked position to prevent the housing from rotating relative to the bonnet.

16. The apparatus according to claim 15, wherein the latch tab is positioned in an aperture of the housing, the latch tab being pivotable between a latched position and an unlatched position, the latch tab further comprising a latch body having a contour matching an outer diameter contour of the housing in the vicinity of the aperture so that the latch body is flush with the outer diameter contour in the latched position.

17. An apparatus for actuating a valve, the apparatus comprising:
- a cylindrical housing having a valve end, a piston end, and a piston end annular surface, a plurality of circumferentially spaced apart piston end lugs protruding from the piston end annular surface to define a plurality of piston end slots therebetween, the housing maintaining a sealed pressure chamber in a released position relative to a bonnet that is operable to be connected to the valve, and when the housing is detached from the bonnet;
- a piston head detachably connectable to the piston end of the housing, the piston head comprising:
  - an inlet,
  - a cylindrical piston housing, the piston housing having a plurality of piston housing lugs spaced apart around a piston housing annular surface, the piston housing lugs protruding from the piston housing annular surface to define a plurality of piston housing slots therebetween, each of the piston housing lugs operable to pass axially through a respective one of the piston end slots when the piston head is in a released position and, after passing through the piston end slots, the piston head being rotatable at least until a portion of one or more of the piston housing lugs is axially aligned with a portion of a respective piston end lug such that the piston end lugs prevent axial movement of the piston head in at least one direction to define a locked position, and
  - a piston within the piston housing, the piston moving between an extended position and a retracted position in response to pressure media from the inlet, the piston being nearer the valve end in the extended position than in the retracted position;
- a down stop in contact with the piston, the down stop being urged toward the valve end of the housing when the piston moves toward the extended position;
- a stem, the stem extending through the bonnet and contacting the downstop so that when the downstop is urged toward the valve end, the stem extends further through the bonnet toward the valve;
- a plurality of housing lugs spaced apart around a housing annular surface, the housing lugs protruding from the housing annular surface to define a plurality of slots therebetween; and
- a bonnet, the bonnet having a plurality of bonnet lugs spaced apart around a bonnet annular surface, the bonnet lugs protruding from the bonnet annular surface to define a plurality of bonnet slots therebetween, each of the housing lugs operable to pass axially through a respective one of the bonnet slots when the housing is in the released position and, after passing through the bonnet slots, the housing being rotatable at least until a portion of one or more of the housing lugs is axially aligned with a portion of a respective bonnet lug such that the bonnet lugs prevent axial movement of the housing in at least one direction to define a locked position.

18. The apparatus according to claim 17, further comprising a latch assembly, the latch assembly preventing the piston head from rotating relative to the housing when the piston head is in the locked position.

19. The apparatus according to claim 18, wherein the latch assembly comprises a latch tab connected to the housing, wherein the latch tab is located within one of the slots and engages one or more of the piston head lugs in the locked position to prevent the housing from rotating relative to the bonnet.

* * * * *